(12) United States Patent
Shao

(10) Patent No.: US 12,341,850 B2
(45) Date of Patent: Jun. 24, 2025

(54) METHODS, SYSTEMS, AND STORAGE MEDIA FOR INFORMATION SERVICE OF INDUSTRIAL INTERNET OF THINGS (IIOT) BASED ON CLOUD PLATFORMS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/916,694

(22) Filed: Oct. 15, 2024

(65) Prior Publication Data

US 2025/0039268 A1    Jan. 30, 2025

(30) Foreign Application Priority Data

Sep. 3, 2024   (CN) .......................... 202411228332.5

(51) Int. Cl.
  *H04L 12/24*    (2006.01)
  *H04L 41/0803*  (2022.01)
  (Continued)

(52) U.S. Cl.
  CPC .................................. *H04L 67/12* (2013.01)

(58) Field of Classification Search
  CPC ... H04L 67/12; H04L 41/0823; H04L 41/142; H04L 41/147; H04L 41/16; H04L 43/08; H04L 43/16; H04L 67/10
  (Continued)

(56) References Cited

U.S. PATENT DOCUMENTS 11,683,246 B2 *  6/2023  Agrawal ............... H04L 41/142
                                          709/224
2016/0274552 A1 * 9/2016 Strohmenger ......... G06Q 10/06
(Continued)

FOREIGN PATENT DOCUMENTS

CN    113615239 A    11/2021
CN    114491171 A     5/2022
(Continued)

OTHER PUBLICATIONS

Zhou, Chengmao, Research on key technologies of Integrated Sensing and Communication, Full-text Database of China's Excellent Master's Thesis, 2023, 102 pages.
(Continued)

*Primary Examiner* — Yves Dalencourt
*Assistant Examiner* — Elizabeth Kassa
(74) *Attorney, Agent, or Firm* — PORUS IP LLC

(57) ABSTRACT

Provided are a method, a system, and a storage medium for information service of Industrial Internet of Things (IIoT) based on a cloud platform. The method includes: obtaining, based on an IIoT sensing network platform, a production condition of a factory, signaling information, and communication information between a communication device and a plurality of data processing devices; determining a data communication effect of each of the plurality of data processing devices based on the production condition, the signaling information, and the communication information; determining a signal interference type of the factory and a probability distribution corresponding to the signal interference type based on data communication effects of the plurality of data processing devices, and generating and sending a communication adjustment instruction to the IIoT sensing network platform.

10 Claims, 4 Drawing Sheets

(51) Int. Cl.
   *H04L 41/142* (2022.01)
   *H04L 41/147* (2022.01)
   *H04L 41/16* (2022.01)
   *H04L 43/08* (2022.01)
   *H04L 43/16* (2022.01)
   *H04L 67/10* (2022.01)
   *H04L 67/12* (2022.01)

(58) Field of Classification Search
   USPC .......................................................... 709/201
   See application file for complete search history.

(56) References Cited

U.S. PATENT DOCUMENTS

| | | | | |
|---|---|---|---|---|
| 2017/0177754 | A1* | 6/2017 | Jin | G06F 17/18 |
| 2019/0386759 | A1* | 12/2019 | Singh | H04B 17/27 |
| 2020/0203026 | A1* | 6/2020 | Huang | G16Y 40/10 |
| 2020/0259896 | A1* | 8/2020 | Sachs | H04L 67/12 |
| 2020/0326684 | A1* | 10/2020 | Chand | G05B 23/024 |
| 2021/0096551 | A1* | 4/2021 | Sayyarrodsari | G06Q 10/06395 |
| 2022/0221844 | A1* | 7/2022 | Amaro, Jr. | H04L 41/344 |
| 2022/0417120 | A1* | 12/2022 | Sesha | H04L 41/142 |
| 2023/0156852 | A1 | 5/2023 | Sanders et al. | |
| 2023/0394045 | A1* | 12/2023 | Nixon | G06F 16/248 |
| 2024/0019847 | A1* | 1/2024 | Sayyar | G05B 23/0275 |

FOREIGN PATENT DOCUMENTS

| | | |
|---|---|---|
| CN | 115226125 A | 10/2022 |
| CN | 116700162 A | 9/2023 |

OTHER PUBLICATIONS

Carlos Mendes Da Costa Jr. et al., Design Methodology for Industrial Internet-of-Things Wireless Systems, IEEE Sensors Journal, 2020, 14 pages.

* cited by examiner

400

410 — Determining a first signal interference type of a factory and a first probability distribution corresponding to the first signal interference type based on an associated production condition, associated signaling information, and an associated predicted communication effect of at least one associated factory

↓

420 — Determining one or more reference factories from the at least one associated factory and determining a second signal interference type of the factory and a second probability distribution corresponding to the second signal interference type based on signaling information of the factory and reference signaling information of the one or more reference factory

↓

430 — Generating a pre-adjustment instruction based on the first signal interference type and the first probability distribution corresponding to the first signal interference type, and generating a real-time adjustment instruction based on the second signal interference type and the second probability distribution corresponding to the second signal interference type

↓

440 — Sending the pre-adjustment instruction and the real-time adjustment instruction to an IIoT sensing network platform, and sending an adjustment result to an IIoT user platform sequentially through an IIoT management platform and an IIoT service platform

FIG. 4

METHODS, SYSTEMS, AND STORAGE MEDIA FOR INFORMATION SERVICE OF INDUSTRIAL INTERNET OF THINGS (IIOT) BASED ON CLOUD PLATFORMS

CROSS-REFERENCE TO RELATED APPLICATIONS

This application claims priority to Chinese Patent Application No. 202411228332.5, filed on Sep. 3, 2024, the entire content of which is hereby incorporated by reference.

TECHNICAL FIELD

The present disclosure relates to the field of Industrial Internet of Things (IIoT), and in particular, to methods, systems, and storage media for information service of Industrial Internet of Things (IIoT) based on cloud platforms.

BACKGROUND

Industrial Internet of Things (IIoT) technology is widely applied in various fields such as manufacturing, smart cities, and energy management. However, due to non-overlapping business operations and different operating regions between different factories or branches of an enterprise, production information is sometimes independently collected and processed by each factory or branch. This can result in information being unsynchronized and difficult to share between different factories or branches, leading to the issue of information silos in IIoT systems across different industries and campuses. This lack of data sharing between IIoT systems further results in low resource utilization efficiency and insufficient decision-making support. Moreover, the challenge of efficiently processing and extracting valuable information from massive industrial data to serve industrial production has become an urgent issue that needs to be addressed.

Therefore, it is desirable to propose a method, a system, and a storage medium for information service of Industrial Internet of Things (IIoT) based on a cloud platform that can realize information sharing, efficient data processing, and intelligent cloud services among different IIoT systems.

SUMMARY

In response to the challenges of addressing difficulties in data sharing among different entities, inefficient resource utilization, and inadequate decision-making support, embodiments of the present disclosure provide a method, a system, and a storage medium for information service of Industrial Internet of Things (IIoT) based on a cloud platform, which enable information interaction between the cloud platform and different IIoT platforms, facilitating information sharing among different IIoT systems, and improving communication efficiency and quality in the industrial production process, while ensuring the accuracy and efficiency of data transmission.

One or more embodiments of the present disclosure provide a method for information service of Industrial Internet of Things (IIoT) based on a cloud platform. The method is implemented based on the cloud platform, which includes distributed servers, and the cloud platform communicates with a plurality of IIoT platforms of a plurality of factories via the distributed servers. Each of the plurality of IIoT platforms includes an IIoT user platform, an IIoT service platform, an IIoT management platform, an IIoT sensing network platform, and an IIoT perception and control platform connected in sequence. The IIoT perception and control platform is configured with a plurality of data processing devices, and the IIoT sensing network platform is communicatively connected to the plurality of data processing devices via a communication device. The method includes: for each of the plurality of factories, obtaining, based on the IIoT sensing network platform, a production condition of the factory, signaling information, and communication information between the communication device and the plurality of data processing devices; determining a data communication effect of each of the plurality of data processing devices based on the production condition, the signaling information, and the communication information, the data communication effect including communication efficiency and communication quality; and determining a signal interference type of the factory and a probability distribution corresponding to the signal interference type of the factory based on data communication effects of the plurality of data processing devices, and generating and sending a communication adjustment instruction to the IIoT sensing network platform. The communication adjustment instruction includes at least one of a position adjustment instruction and a parameter adjustment instruction. The position adjustment instruction is used for adjusting setting positions of the data processing devices, and the parameter adjustment instruction is used for adjusting communication parameters of the data processing devices.

One or more embodiments of the present disclosure provide a system for information service of Industrial Internet of Things (IIoT) based on a cloud platform, wherein the system includes the cloud platform and a plurality of IIoT platforms of a plurality of factories. The cloud platform incudes distributed servers, and the cloud platform communicates with the plurality of IIoT platforms of the plurality of factories via the distributed servers. Each of the plurality of IIoT platform includes an IIoT user platform, an IIoT service platform, an IIoT management platform, an IIoT sensing network platform, and an IIoT perception and control platform connected in sequence. The IIoT perception and control platform is configured with a plurality of data processing devices, and the IIoT sensing network platform is communicatively connected to the plurality of data processing devices via a communication device. The cloud platform is configured to: for each of the plurality of factories, obtain, based on the IIoT sensing network platform, a production condition of the factory, signaling information, and communication information between the communication device and the plurality of data processing devices; determine a data communication effect of each of the plurality of data processing devices based on the production condition, the signaling information, and the communication information, the data communication effect including communication efficiency and communication quality; and determine a signal interference type of the factory and a probability distribution corresponding to the signal interference type of the factory based on data communication effects of the plurality of data processing devices, and generate and send a communication adjustment instruction to the IIoT sensing network platform. The communication adjustment instruction includes at least one of a position adjustment instruction and a parameter adjustment instruction. The position adjustment instruction is used for adjusting setting positions of the data processing devices, and the parameter adjustment instruction is used for adjusting communication parameters of the data processing devices.

One or more embodiments of the present disclosure provide a non-transitory computer-readable storage medium, wherein the storage medium stores a computer instruction, and when the computer instruction is executed by a processor, a method for information service of Industrial Internet of Things (IIoT) based on a cloud platform is implemented.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein:

FIG. 4 is a flowchart illustrating an exemplary process for determining a pre-adjustment instruction and a real-time adjustment instruction according to some embodiments of the present disclosure.

DETAILED DESCRIPTION

Figure 1:
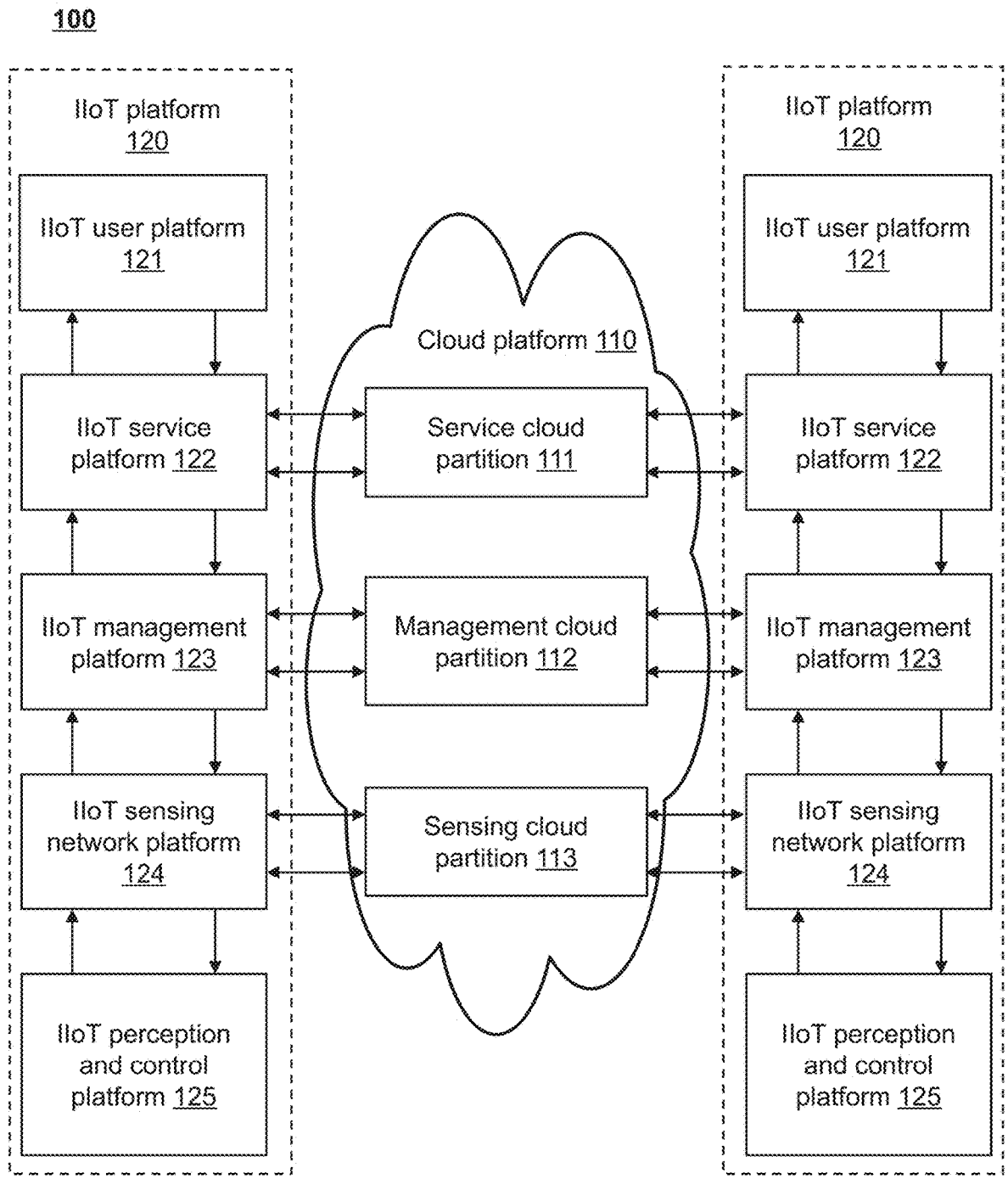
FIG. 1 is a schematic diagram illustrating an exemplary structure of a system for information service of Industrial Internet of Things (IIoT) based on a cloud platform according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a schematic diagram illustrating an exemplary structure of a system for information service of Industrial Internet of Things (IIoT) based on a cloud platform according to some embodiments of the present disclosure. As shown in FIG. 1, a system 100 for information service of Industrial Internet of Things (IIoT) based on a cloud platform (hereinafter the system 100) includes a cloud platform 110 and a plurality of IIoT platforms 120 (two IIoT platforms 120 are shown in FIG. 1 as an example).

The cloud platform 110 is a service platform based on cloud computing technology, which may provide various computing resources and services over the Internet. In some embodiments, the cloud platform 110 includes distributed servers, and the cloud platform 110 communicates with a plurality of IIoT platforms 120 of a plurality of factories via the distributed servers.

In some embodiments, the cloud platform 110 includes a service cloud partition 111, a management cloud partition 112, and a sensing cloud partition 113 that are mutually independent and may access to integrated information systems of different IIoT systems. These cloud partitions may exist as independent service units in different physical or logical locations, or in the form of partitions within a same cloud architecture to ensure the independence and security of data, while facilitating centralized management and scheduling of resources.

The service cloud partition 111, the management cloud partition 112, and the sensing cloud partition 113 are partitions of the cloud platform 110 for providing different cloud services.

In some embodiments, the service cloud partition 111 is communicatively connected to the IIoT service platform 122 for obtaining service information of the IIoT platform 120.

In some embodiments, the management cloud partition 112 is communicatively connected to the IIoT management platform 123 for obtaining management information of the IIoT platform 120.

In some embodiments, the sensing cloud partition 113 is communicatively connected to the IIoT sensing network platform 124 for obtaining sensing information of the IIoT platform 120.

In some embodiments, an information receiving and processing module, a big data processing module, and a service provision module may be integrated within the cloud platform 110. In other embodiments, the information receiving and processing module, the big data processing module, and the service provision module may be integrated within the service cloud partition 111, the management cloud partition 112, and the sensing cloud partition 113.

The information receiving and processing module is responsible for receiving and processing information uploaded by different IIoT platforms 120. In some embodiments, the information receiving and processing module may perform feature recognition and categorization processing on the uploaded information.

In some embodiments, the information receiving and processing module may receive data uploaded by different IIoT platforms 120 based on a data front-end gateway and perform standardization of data format and protocol. In some embodiments, the information receiving and processing module may perform feature extraction on standardized processed data, classify the standardized processed data based on the extracted features, and establish a mapping relationship. In some embodiments, the extracted features may include a data source, an industry to which the data corresponds, a data type (e.g., sensing information, management information, service information, or the like), and a data category (e.g., order scheduling data, quality management data, safety management data, troubleshooting data, user service data, resource allocation data, or the like).

Processing data based on the information receiving and processing module can effectively improve data processing efficiency, enhance data compatibility, optimize data storage structure, achieve efficient data mapping, support refined management and decision-making, promote data value mining, and improve system scalability and maintainability, thereby providing strong support for the effective operation and in-depth application of IIoT systems.

A plurality of big data processing module may be provided. The plurality of big data processing modules may be deployed in a distributed architecture on the distributed servers.

In some embodiments, a resource prioritization and dynamic provisioning mechanism may be configured for the plurality of big data processing modules. The resource prioritization and dynamic provisioning mechanism may include: configuring resources for a main task of the plurality of big data processing modules based on different dimensions, and prioritizing resources of the big data processing modules to complete the main task processing work. The different dimensions may be different service regions, different service industries, different categories of requesting users, or the like. When a big data processing module is saturated with pending tasks, and an estimated time to complete the requested tasks exceeds a preset threshold, the system 100 may traverse the working status of other big data processing modules and allocate the pending tasks to other big data processing modules with available resources.

Through the distributed architecture and dynamic resource provisioning mechanism, the resource utilization, scalability, flexibility, stability, and reliability of the big data processing modules are significantly improved. At the same time, user experience is optimized, and operational costs are reduced, thereby providing a more efficient and reliable solution for big data processing.

In some embodiments, the big data processing module may utilize data analysis algorithms to deeply mine IIoT cloud data (e.g., service information, sensing information, management information, or the like) stored in a database to extract valuable data features. In some embodiments, the big data processing modules may integrate and combine data from different data sources based on different feature dimensions; introduce an industry knowledge base and expert experience to assist in feature selection and model construction based on industry characteristics corresponding to the data; and construct a machine learning model to mine the data. For example, for order scheduling data, the big data processing module may analyze a difference between a production plan and actual execution to optimize and find a scheduling strategy to improve production efficiency. For user service data, the big data processing module may analyze user demand and feedback to optimize a service process and improve user satisfaction. For safety management data, the big data processing module may analyze how to monitor equipment operating status and environmental parameters to predict potential safety hazards and take timely measures to prevent the safety hazards.

Adopting the above big data processing module has the following beneficial effects. (1) By integrating and combining data from different data sources and analyzing them based on different feature dimensions, more comprehensive and in-depth data insights can be obtained, which enables enterprises to make decisions based on broader and more accurate information, thereby increasing the reasonableness and accuracy of decision-making. (2) For different types of data (e.g., order scheduling, user service, safety management, or the like), the introduction of an industry knowledge base and expert experience, combined with machine learning models for data mining, can accurately identify bottlenecks, optimization points, and potential risks in the business process. Based on these insights, companies may optimize production scheduling, improve service processes, strengthen safety management, or the like, thus significantly improving operational efficiency and overall performance. (3) The deep data mining not only reveals problems and opportunities in the existing business operations, but also provides strong support for innovation and business model change. Based on the insights from data analysis, enterprises may explore new market opportunities, develop new products or services, optimize business models, and enhance the competitiveness of the enterprise. (4) Through the in-depth mining and analysis of the big data processing module, fragmented data originally scattered in various data sources are integrated into valuable data assets. The data assets not only provide support for internal decision-making, but also serve as an important resource for external cooperation, market expansion, or the like, to further enhance the value of the data assets for enterprises.

The service provision module is configured to output corresponding demand service information based on a service request to support the intelligent decision-making and efficient operation of the system 100. In some embodiments, the service provision module may be configured to receive service request data from the IIoT platform 120 and identify service request dimension characteristics corresponding to different dimension configurations of the big data processing modules, respectively. The service provision module may be configured to send, based on a service request dimension characteristic, service request data to the corresponding big data processing module, where the big data processing module matches the service request data feature. The service provision module may be further configured to utilize a data analysis algorithm to deeply mine the IIoT cloud data stored in a database, and extract valuable data features. The service provision module may be further configured to receive arithmetic feedback from the big data processing modules and send the feedback to a requesting user.

The IIoT platform 120 is a comprehensive technology platform designed specifically for an industrial environment, which utilizes IoT technology to connect industrial devices, machines, sensors, and people for data collection, transmission, analysis, and application. Each factory may correspond to an IIoT platform 120.

In some embodiments, the IIoT platform 120 includes an IIoT user platform 121, an IIoT service platform 122, an IIoT management platform 123, an IIoT sensing network platform 124, and an IIoT perception and control platform 125 connected in sequence.

The IIoT user platform 121 is a platform for interacting with users. The users include individuals who take ownership of the IIoT, such as a person in charge of a related business or a factory leader. The IIoT user platform 121 may be configured as a terminal device.

The IIoT service platform 122 is a platform for processing and communicating service information. The service information refers to information related to user services in the IIoT, including service sensing information and service control information.

In some embodiments, the IIoT service platform 122 may process the service information in real time and upload a processing and operation characteristic of the service information to the service cloud partition 111. The processing and operation characteristic of the service information include the extraction of user preference features, the pushing of the service information, the prioritization and processing of the service information, the matching of the service information, or the like.

The IIoT management platform 123 is responsible for the resource management, monitoring, and maintenance of the entire IIoT platform 120 to ensure the stable operation of the system 100 and to provide perception management and control management functions for the operation of the system 100. In some embodiments, the IIoT management platform 123 may realize the processing and operation of management information. The management information refers to information related to user management in IIoT, including management sensing information (e.g., equipment maintenance plans, abnormal alarms, or the like) and management control information (e.g., production scheduling, resource allocation, or the like).

In some embodiments, the IIoT management platform 123 may upload a processing and operation characteristic of the management information to the management cloud partition 112 to support global optimization and decision support. The processing and operation characteristic of the management information include processing and operation mechanisms for classified storing and recalling the management information, order scheduling, equipment management, quality management, or the like.

The IIoT sensing network platform 124 is a platform for collection, transmission and initial processing of sensing information. The sensing information is information related to sensing communication, including sensing perception information (e.g., raw sensor data) and sensing control information (e.g., control commands sent to actuators).

In some embodiments, the IIoT sensing network platform 124 may upload a processing and operation characteristic of the sensing information to the sensing cloud partition 113 to provide base data for data analysis and prediction. The processing and operation characteristic of the sensing information include classification and identification of the sensing information, storage and transmission of the sensing information, or the like.

The IIoT perception and control platform 125 is a platform that enables device sensing and control. In some embodiments, the IIoT perception and control platform 125 may be configured with a plurality of data processing devices. In some embodiments, the IIoT sensing network platform 124 is configured with a communication device, and the IIoT sensing network platform 124 may be communicatively connected to the plurality of data processing devices via the communication device.

In order to realize seamless interfacing between the IIoT platform 120 and the cloud platform 110, dedicated communication interfaces are provided in some embodiments of the present disclosure. These communication interfaces include an interface of the IIoT service platform, an interface of the IIoT management platform, and an interface of the IIoT sensing network platform, which are respectively used for the information interaction between the IIoT service platform and the service cloud partition, the information interaction between the IIoT management platform and the management cloud partition, and the information interaction between the IIoT sensing network platform and the sensing cloud partition. By designing the dedicated communication interfaces, different types of IIoT systems may seamlessly interface with the corresponding cloud platform or cloud partition, thereby reducing additional workloads and costs due to interface mismatches in system integration, ensuring the accuracy and efficiency of data transmission, and reducing the complexity and cost of system integration.

In some embodiments, the communication interfaces may use a unified communication protocol. In some embodiments, a dedicated protocol may be designed based on an existing industrial communication standard or customized according to actual needs. The industrial communication standard may be a standard such as MQTT, OPC UA, Modbus, or the like. Developing a unified communication protocol for the communication interfaces between IIoT systems and the cloud platform may standardize the communication interfaces.

By formulating the unified communication protocol, the data format, transmission mode, and security requirements are clearly defined, thus avoiding data errors or loss due to inconsistent formats or incompatible transmission modes, which in turn enhances the accuracy and efficiency of data transmission. At the same time, the adoption of the unified communication protocol and standardized interface design also facilitates subsequent system expansion and maintenance, and reduces long-term operating costs.

In some embodiments, an efficient data transfer protocol may be used. The efficient data transfer protocol may include HTTP/2, WebSocket, or the like. In some embodiments, sensitive data may be encrypted by a security protocol. The security protocol may include HTTPS, TLS/SSL, or the like. Adopting the efficient data transmission protocol and encryption technologies not only ensures real-time and reliable data transmission, but also enhances the security of the data transmission process, thereby preventing illegal data theft or tampering.

In some embodiments, the cloud platform may be configured with an abnormality handling mechanism and a fault-tolerance mechanism to capture and handle errors (e.g., data format errors, network interruptions, or the like) that may occur during the transmission process.

In some embodiments, the cloud platform may be configured with a multi-level redundancy mechanism encompassing hardware, software, and data to capture and handle errors (e.g., data format errors, network interruptions, or the like) that may occur during the transmission process.

In terms of hardware, a failure recovery capability may be provided by deploying additional hardware devices, such as servers, switches, and storage devices, so that when a primary device fails, a backup device may automatically take over the work to ensure the continuity of service.

In terms of software, rapid recovery in case of failure may be achieved by creating and deploying data replicas (mirrors) on different physical or virtual nodes. When a primary node fails, the system 100 may quickly switch over to a mirror node, thereby avoiding service interruptions and achieving rapid recovery in case of failure. The deployment revolves around using the primary node as a central node and a plurality of mirror nodes as distributed nodes to establish a network topology between the primary node and mirror nodes. A heartbeat mechanism is used between the primary and mirror nodes to monitor each other's status. A data replica is created on the primary node and is first synchronized to a first mirror node. If the first mirror node fails, synchronization is directed to a second mirror node. Data consistency checks are performed on the synchronized data, and if inconsistencies are detected, data resynchronization or error handling is initiated. In the event of a primary node failure, the first mirror node automatically switches to the primary node and assumes communication service tasks, while data synchronization is established between the first and second mirror nodes.

In terms of data, a distributed storage system may be used to distribute data across a plurality of nodes and enhance the reliability and availability of the data through redundant coding (e.g., erasure coding).

The introduction of the multi-level redundancy mechanism further improves the fault-tolerance and fault-recovery capabilities of the system 100, ensuring that the system 100 can quickly switch to a backup device or node to ensure service continuity even when part of the devices or nodes fail.

In some embodiments, data may be further verified for integrity and accuracy by adding additional validation information, such as checksums, hashes, or the like, to implement the fault-tolerance mechanism. By adding additional validation information, an error detection capability of the system 100 may be enhanced to detect whether the data is complete and error-free. Once a data error is detected, the cloud platform may quickly take corrective action or request the IIoT systems to re-transmit data to ensure the accuracy and integrity of the data.

By adopting the abnormality handling mechanism and the fault-tolerance mechanism, the system 100 can effectively respond to various abnormal situations that may occur during the data transmission process, such as data format errors, network interruptions, or the like, to ensure the stable operation of the system 100. The introduction of the multiple redundancy mechanisms further improves the fault-tolerance and fault recovery capabilities of the system 100. Even if part of the devices or nodes of the system 100 fail, the system 100 can quickly switch to the backup device or node, ensuring the continuity of service.

In summary, through a series of innovative designs, the data interaction capability, system stability, reliability, and data security between the IIoT systems and the cloud platform can be significantly improved, thereby providing strong support for the wide application and in-depth development of the IIoT.

The embodiments of the present disclosure provide a system for information service of Industrial Internet of Things (IIoT) based on a cloud platform, which integrates the cloud platform and a plurality of IIoT platforms to achieve in-depth monitoring and optimization of industrial production processes. Using the distributed servers of the cloud platform, the system can efficiently communicate with various IIoT platforms to ensure the real-time transmission and processing of data. The multi-layered structure of the IIoT platforms enables the system to comprehensively cover all aspects from data collection to decision support. The system effectively solves the problem of information silos between different IIoT platforms, and realizes the sharing and interoperability of operational characteristic information. Meanwhile, with the powerful capabilities of the big data processing module, the system can deeply excavate the value of the data and provide accurate, real-time service support for the IIoT platforms. The system for information service of Industrial Internet of Things (IIoT) based on the cloud platform not only improves the efficiency and flexibility of industrial production, but also promotes the optimal allocation of resources and sustainable development.

Figure 2:
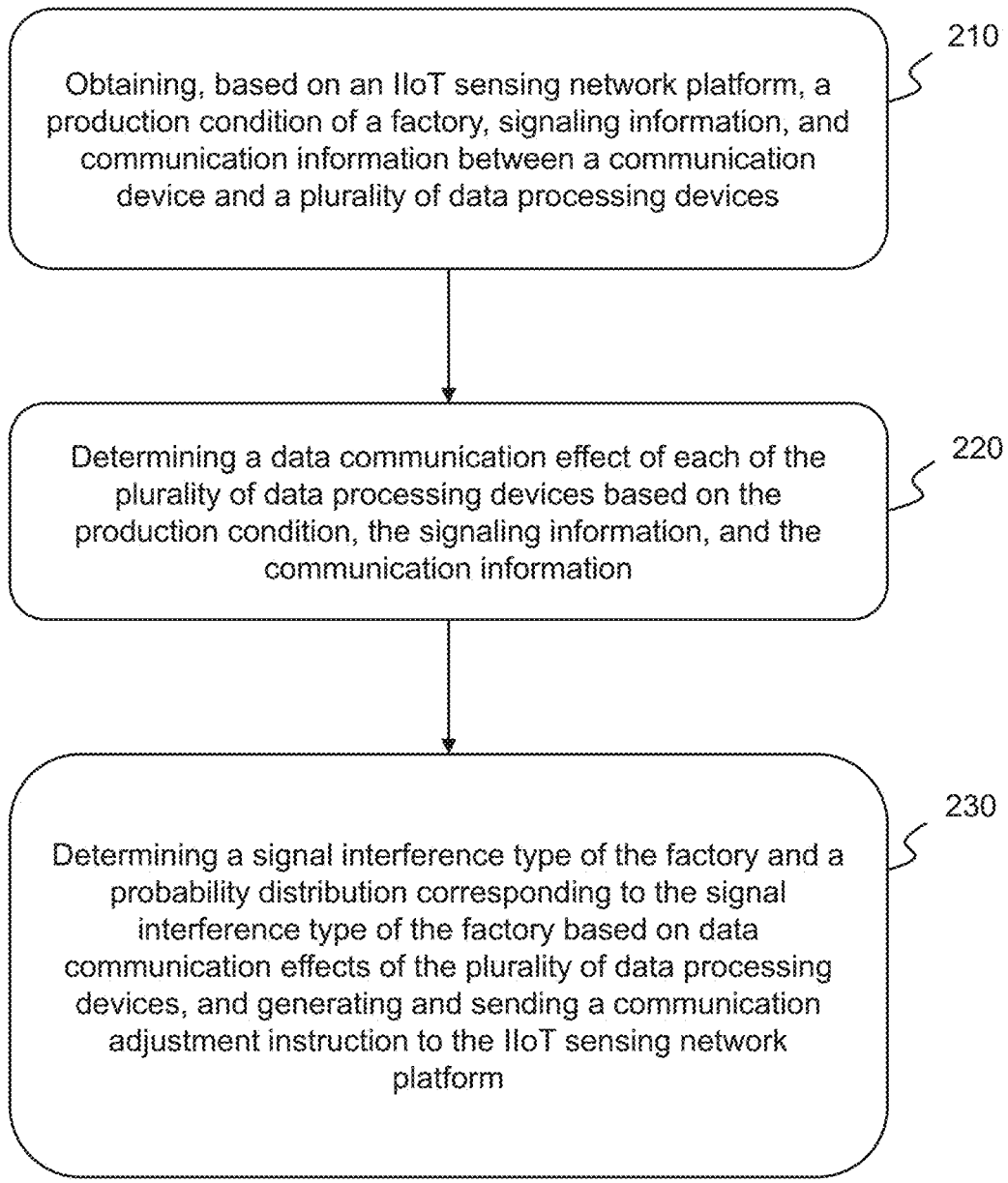
FIG. 2 is a flowchart illustrating an exemplary process of a method for information service of Industrial Internet of Things (IIoT) based on a cloud platform according to some embodiments of the present disclosure.

FIG. 2 is a flowchart illustrating an exemplary process of a method for information service of Industrial Internet of Things (IIoT) based on a cloud platform according to some embodiments of the present disclosure. In some embodiments, process 200 may be performed by a cloud platform. As shown in FIG. 2, the process 200 includes the following operations.

In 210, obtaining, based on an IIoT sensing network platform, a production condition of a factory, signaling information, and communication information between a communication device and a plurality of data processing devices.

In some embodiments, the production condition may include parameters related to an environment in which a product is produced. For example, the production condition may include ambient humidity, space area, or the like. In some embodiments, the production condition may also include parameters related to data communication when producing the product, such as a count of enabled data processing devices on a production line required for data communication, or the like. More descriptions of the data processing device may be found in related descriptions below.

The signaling information refers to parameters related to signal transmission, for example, a wireless communication distance between the data processing device on the production line and the communication device, obstacle distribution information, a communication frequency, or the like. The corresponding signaling information may be determined for the different production lines within the factory.

The wireless communication distance is a distance over which a signal needs to be transmitted when the data processing device communicates wirelessly with the communication device. For example, the wireless communication distance may be a straight line distance between the data processing device and the communication device, or the like. In some embodiments, the data processing device may move along with a conveyor on the production line, and the wireless communication distance accordingly varies within a certain range. In this case, the wireless communication distance may be an intermediate or maximum value of the varying range.

It should be noted that there may be a plurality of data processing devices, and a wireless communication distance may be correspondingly determined between each of the plurality of data processing devices and a corresponding communication device.

The obstacle distribution information is data related to a distribution of obstacles. For example, the obstacle distribution information may include a count, positions, sizes, or the like, of obstacles between the data processing device and the communication device. The obstacles referred to in the embodiments of the present disclosure are objects that affect data transmission. Types of obstacles include, but are not limited to, production raw materials, waste materials, or the like.

The communication frequency is a frequency at which communication is carried out between the data processing device and the communication device.

In some embodiments, the IIoT sensing network platform may communicate with an IIoT perception and control platform. The IIoT sensing network platform may be communicatively connected to the plurality of data processing devices configured in the IIoT perception and control platform via the communication device to obtain the production condition and the signaling information. The cloud platform (e.g., a sensing cloud partition in the cloud platform) may be in data interaction with the IIoT sensing network platform to obtain the production condition and the signaling information.

The data processing devices are devices that process data from a production process. In some embodiments, the data processing devices may be installed on a production line. For example, the data processing devices may be installed on production equipment corresponding to different production processes on a production line, or the like.

In some embodiments, types of the data processing devices may include acquisition devices, monitoring devices, control devices, or the like. There may be a plurality of data processing devices, for example, at least one acquisition device, at least one monitoring device, at least one control device.

In some embodiments, the at least one acquisition device may include a temperature sensor, a pressure sensor, etc., for acquiring an environment temperature, pressure data, etc., during product production, respectively. In some embodiments, the at least one acquisition device may be installed near the production equipment on the production line.

In some embodiments, the at least one monitoring device may include a gas analyzer, a noise detector, a camera, etc., for monitoring levels of harmful gas and noise in the environment, and the distribution of obstacles within the factory, respectively. In some embodiments, the at least one monitoring device may be installed on a wall or ceiling of the factory.

In some embodiments, the at least one control device may be configured to control operation parameters of the production equipment. In some embodiments, the at least one control device may be installed in a console.

The communication device is configured to realize data transmission between the data processing device and the IIoT sensing network platform. A count of the communication device may be one or more. The one or more communication devices may be gateways, or the like. In some embodiments, the one or more communication device may be connected to the data processing devices via a wired connection or a wireless LAN.

The communication information refers to communication parameters related to data communication between the data processing devices and the one or more communication devices. For each data processing device installed on the production line, communication information between the data processing device and the corresponding communication device may be determined.

In some embodiments, the communication information includes a communication duration, a communication data volume, or the like.

The communication duration is a period of time spent transmitting data, e.g., the communication duration may be a period of time spent transmitting a piece of data or a set of data, or the like.

The communication data volume is an amount of data that is successfully transmitted within a certain period of time, for example, the amount of data that is successfully transmitted in one hour.

In some embodiments, the communication information may include a first type of communication information between the acquisition device and the communication device, a second type of communication information between the monitoring device and the communication device, and/or a third type of communication information between the control device and the communication device. For example, the first type of communication information may include the communication duration, the communication data volume, or the like between the acquisition device and the communication device. The second type of communication information may include the communication duration, the communication data volume, or the like between the monitoring device and the communication device. The third type of communication information may include the communication duration, the communication data volume, or the like between the control device and the communication device.

In some embodiments, the IIoT perception and control platform may obtain a communication log of the data processing device and upload the communication log to the IIoT sensing network platform. The communication log may be uploaded by the IIoT sensing network platform to the cloud platform, and the cloud platform may determine the communication information based on the communication log.

In 220, determining a data communication effect of each of the plurality of data processing devices based on the production condition, the signaling information, and the communication information.

The data communication effect is an indicator used to evaluate data communication performance. The data communication effect includes communication efficiency, communication quality, or the like.

The communication efficiency refers to an effectiveness of data transmission. The communication quality is reliability of the transmitted data.

In some embodiments, the cloud platform may determine, based on the production condition and the signaling information, an ideal communication duration and an ideal communication data volume corresponding to the production condition and the signaling information by querying a communication effect table. The ideal communication duration and the ideal communication data volume refer to the communication duration and the communication data volume under an ideal condition, respectively. It should be noted that when the queried ideal communication duration and/or the ideal communication data volume include a plurality of values, the smallest of the values may be taken.

In some embodiments, the communication effect table includes a correspondence between combinations of production conditions and pieces of signaling information and combinations of ideal communication durations and ideal communication data volumes. In some embodiments, the communication effect table may be determined based on historical data. The historical data may include pieces of historical communication information and corresponding historical production conditions and pieces of historical signaling information. For a plurality of pieces of historical communication information (including historical communication durations and historical communication data volumes) corresponding to each combination of a historical production condition and a piece of historical signaling information, the cloud platform may determine an average of a plurality of historical communication durations and an average of a plurality of historical communication data volumes. The cloud platform may determine the average of the plurality of historical communication durations as the ideal communication data volume corresponding to the combination of the historical production condition and the piece of historical signaling information, and determine the average of the plurality of historical communication data volumes as the ideal communication data volume corresponding to the combination of the historical production condition and the piece of historical signaling information.

In some embodiments, for each of the plurality of data processing devices installed on the production line, the cloud platform may determine the communication duration in the communication information of the data processing device as an actual communication duration corresponding to the production condition and the signaling information, and determine the communication data volume in the communication information of the data processing device as an actual communication data volume corresponding to the production condition and the signaling information. The cloud platform may then determine the communication efficiency and the communication quality of the data processing device based on the ideal communication duration, the ideal communication data volume, the actual communication duration, and the actual communication data volume. For example, the cloud platform may determine a ratio of the ideal communication duration to the actual communication duration as the communication efficiency, and a ratio of the actual communication data volume to the ideal communication data volume as the communication quality.

In some embodiments, the cloud platform may also determine a predicted communication effect of the data processing device in a future time period based on the obstacle distribution information and the wireless communication distance. More descriptions of the predicted communication effect may be found in FIG. 3 and the related descriptions thereof.

In 230, determining a signal interference type of the factory and a probability distribution corresponding to the signal interference type of the factory based on data communication effects of the plurality of data processing devices, and generating and sending a communication adjustment instruction to the IIoT sensing network platform.

The signal interference type refers to a type of an interference factor that results in reduced data communication effect. The signal interference type may include a plurality of types. For example, the signal interference type include types such as excessively high environment humidity, influence of obstacles, excessively long wireless communication distance, and excessively high communication frequency. The probability distribution is a probability of occurrences of different types of signal interference types.

In some embodiments, for each of the plurality of data processing devices installed on the production line, the cloud platform may obtain a plurality of historical data communication effects of the data processing device during a preset historical time period, and determine the signal interference type and the probability of occurrence of the signal interference type based on historical data communication effects that are less than a predetermined communication effect threshold. The predetermined communication effect threshold may be set manually. In some embodiments, the predetermined communication effect threshold includes a predetermined efficiency threshold and a predetermined data volume threshold, and the historical data communication effects that are less than the predetermined communication effect threshold include any one of historical data communication effects that are less than the predetermined efficiency threshold or historical data communication effects that are less than the predetermined data volume threshold.

In some embodiments, for at least one historical data communication effect that is less than the predetermined communication effect threshold, the cloud platform may establish the corresponding historical production condition and historical signaling information thereof as at least one data set. The cloud platform may construct cluster historical feature vectors based on the historical production condition and historical signaling information of the at least one data set, and clustering the historical feature vectors via a clustering algorithm to obtain at least one cluster set. Each cluster set may include at least one data set. In some embodiments, for each cluster set, the cloud platform may determine a vector mean of the historical feature vectors of the at least one data set in the cluster set as a central feature vector corresponding to the cluster set. Types of the clustering algorithm may include a variety of types, for example, the clustering algorithm may include K-Means clustering, Density-Based Clustering Approach (DBSCAN), or the like.

In some embodiments, the cloud platform may identify the cluster sets whose counts of data sets greater than a quantity threshold as target clusters, and determine, for each of the target clusters, the signal interference type of the target cluster based on the central feature vector corresponding to the target cluster. Then the cloud platform may determine a ratio of the count of data sets contained in the target cluster to a total count of data sets as the probability of occurrence of the signal interference type. Finally, the cloud platform may determine the probability distribution based on signal interference types corresponding to the at least one target cluster and the probabilities of occurrence of the signal interference types.

In some embodiments, the cloud platform may pre-construct a correspondence table including a correspondence between signal interference types and central feature vectors corresponding to cluster sets. After obtaining the central feature vector corresponding to a target cluster, the cloud platform may query the correspondence table to obtain the signal interference type of the target cluster.

In some embodiments, the quantity threshold is related to the total count of communication effect data sets. For example, the quantity threshold may be the total count multiplied by a preset ratio, and the preset ratio may be set based on historical experience, such as, 30% or the like.

The communication adjustment instruction is an instruction that is used to make adjustments to influencing factors of data communication. The influencing factors include, but are not limited to, the obstacle distribution, the wireless communication distance, the communication frequency, or the like. In some embodiments, the communication adjustment instruction includes at least one of a position adjustment instruction and a parameter adjustment instruction.

The position adjustment instruction is an instruction used to adjust a position of an object. The object includes at least one of the data processing device and, or the obstacle, or the like. In some embodiments, the position adjustment instruction may be used for adjusting at least one of setting positions of the data processing devices and positions of the obstacles. In some embodiments, the position adjustment instruction includes a first position distribution corresponding to the data processing devices and/or a second position distribution corresponding to the obstacles, or the like.

The first position distribution is a distribution of adjusted positions of the data processing devices. The second position distribution is a distribution of adjusted positions of the obstacles.

In some embodiments, the cloud platform may determine the first position distribution and/or the second position distribution based on the signal interference type of the factory and the probability distribution corresponding to the signal interference type, and generate the position adjustment instruction that includes the first position distribution and/or the second position distribution. For example, if the signal interference type is caused by an obstacle, such as when the probability of occurrences corresponding to the influence of obstacles in the signal interference type is the highest, the loud platform may determine the second position distribution. If the signal interference type is caused by the data processing device, such as when the probability of occurrence corresponding to the excessively long wireless communication distance or the excessively high communication frequency in the signal interference type is the highest, the cloud platform may determine the first location distribution.

In some embodiments, the cloud platform may determine, based on the historical data, a correspondence between signal interference types and the corresponding probability distributions with the first location distribution, and a correspondence between the signal interference types and the corresponding probability distributions with the second location distribution. For example, to determine the correspondence between the signal interference types and the corresponding probability distributions with the first position distribution, the cloud platform may retrieve historical data of adjustments made to the position of at least one data processing device. The historical data includes an adjustment record of a plurality of adjustments made to the position of the at least one data processing device, and a signal interference type present in the factory at the time the position adjustment was made and the corresponding probability distribution. The cloud platform may determine a preferred position distribution of the at least one data processing device under the signal interference type and the corresponding probability distribution based on the adjustment record with a best adjustment effect. The best adjustment effect means that the data communication effect of the at least one data processing device is relatively god when the at least one data processing device is at the adjusted position distribution. By analyzing a large amount of historical data, it is possible to obtain the preferred position distribution under a plurality of signal interference types and the corresponding probability distributions, thus establishing the correspondence between the signal interference type and the corresponding probability distribution with the first position distribution. Further, the cloud platform may determine the first position distribution based on an actually determined signal interference type, the probability distribution corresponding to the actually determined signal interference type, and the aforementioned correspondence. The second position distribution may be determined in a manner similar to the manner of determining the first position distribution, and will not be repeated herein.

Merely by way of example, if the signal interference type with the highest probability of occurrence is the excessively long wireless communication distance, the cloud platform may determine the first position distribution and generate the position adjustment instruction. The cloud platform may send the position adjustment instruction to the IIoT sensing network platform. In some embodiments, the position adjustment instruction may be further sent by the IIoT sensing network platform to an IIoT management platform, and the IIoT management platform may control a handling robot to move a data processing device whose position is required to be adjusted the to a corresponding position in the first position distribution. As another example, if the signal interference type with the highest probability of occurrence is the influence of obstacles, the cloud platform may determine the second position distribution and generate the position adjustment instruction. The cloud platform may send the position adjustment instruction to the IIoT sensing network platform. In some embodiments, the position adjustment instruction may be further sent by the IIoT sensing network platform to the IIoT management platform, and the IIoT management platform may control the handling robot to move an obstacle whose position is required to be adjusted to a corresponding position in the second position distribution. The handling robot may move the obstacle via a manipulator, a bracket, or the like, and change the position of the data processing device. In some embodiments, the handling robot is communicatively connected to the IIoT management platform via the communication device, and the IIoT management platform may, in response to receiving the position adjustment instruction, control the handling robot to change the position of the data processing device and the position of the obstacle.

The parameter adjustment instruction is an instruction for adjusting communication parameters between the data processing device and the communication device. In some embodiments, the parameter adjustment instruction includes types of communication parameters to be adjusted and corresponding parameter adjustment amounts.

The communication parameters are parameters related to communication between the data processing device and the communication device, for example, a communication frequency, a communication data volume, or the like.

In some embodiments, the cloud platform may, based on the signal interference type of the factory and the corresponding probability distribution, determine the types of communication parameters that need to be adjusted and the corresponding parameter adjustment amounts, and generate the corresponding parameter adjustment instruction. For example, the cloud platform may determine, based on the signal interference type that has the highest probability of occurrence in the probability distribution, the types of communication parameters that need to be adjusted and the corresponding parameter adjustment amounts by querying a parameter comparison table.

In some embodiments, the parameter comparison table includes a correspondence between the signal interference types with the highest probability of occurrence for the data processing devices and the types of communication parameters to be adjusted and the parameter adjustment amounts thereof. The parameter comparison table may be obtained based on historical data. For example, the cloud platform may determine the data processing device in the historical adjustments for which the adjusted data communication effect reaches a preset communication threshold, and determine the parameter adjustment amount based on the amount of change in the communication parameter before and after the adjustments.

In some embodiments, the cloud platform may send the parameter adjustment instruction to the IIoT sensing network platform. In some embodiments, the parameter adjustment instruction may be further sent by the IIoT sensing network platform to the plurality of data processing devices configured in the IIoT perception and control platform to control the data processing devices to adjust the parameters.

Some embodiments of the present disclosure, by determining the data communication effects of the data processing devices, the signal interference type and the corresponding probability distribution that leads to a decrease in the communication effects can be determined. Based on the determined signal interference type and the corresponding probability distribution, adjustments to factors influencing the data communication can be made to improve the data communication effects of the data processing devices, thereby ensuring the smooth production of a product.

In some embodiments, the communication adjustment instruction further includes a pre-adjustment instruction and a real-time adjustment instruction.

The pre-adjustment instruction is an instruction to adjust in advance based on the predicted communication effect.

The pre-adjustment instruction includes a pre-position adjustment instruction and a pre-parameter adjustment instruction.

The real-time adjustment instruction is an instruction to adjust in real time based on the actual data communication effect. The real-time adjustment instruction includes a real-time position adjustment instruction and a real-time parameter adjustment instruction.

More descriptions of the pre-adjustment instruction and the real-time adjustment instruction may be found in the relevant descriptions below.

Figure 3:
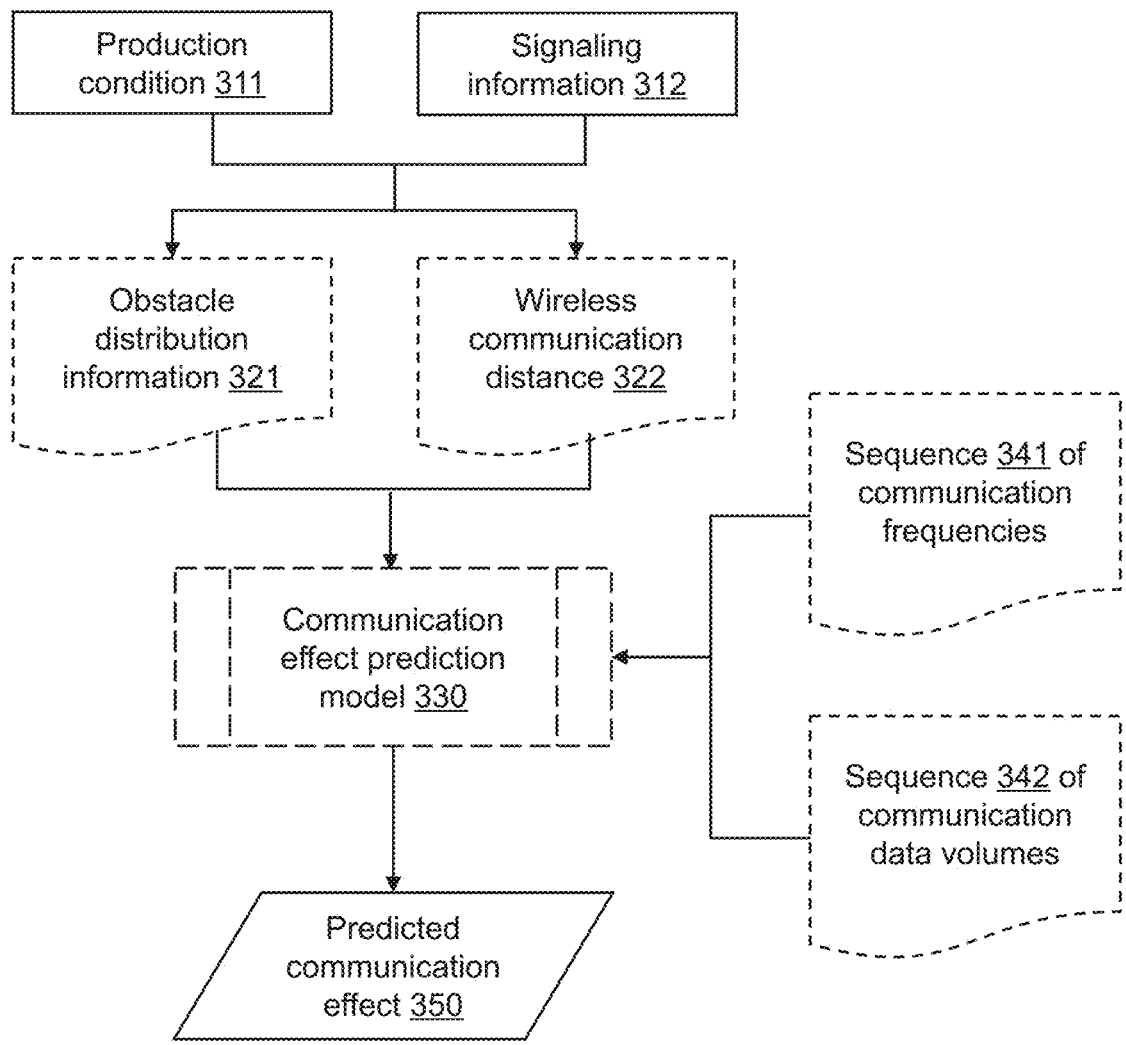
FIG. 3 is a schematic diagram illustrating determination of a predicted communication effect according to some embodiments of the present disclosure.

FIG. 3 is a schematic diagram illustrating determination of a predicted communication effect according to some embodiments of the present disclosure.

As shown in FIG. 3, in some embodiments, a cloud platform may obtain obstacle distribution information 321 and a wireless communication distance 322 of each of a plurality of data processing devices based on a production condition 311 and signaling information 312. The cloud platform may further determine a predicted communication effect 350 of each of the plurality of data processing devices in a future time period based on the obstacle distribution information 321 and the wireless communication distance 322 of each of the plurality of data processing devices.

In some embodiments, the cloud platform may extract the obstacle distribution information from the production condition and extract the wireless communication distance from the signaling information.

More descriptions of the production condition, the signaling information, the obstacle distribution information, the wireless communication distance, and the data processing device may be found in FIG. 2 and the related descriptions thereof.

The predicted communication effect is a pre-assessed data communication effect. For example, the data communication effect of each of the plurality of data processing devices during a next production cycle/process/batch may be pre-assessed before the start of the next production cycle/process/batch. The predicted communication effect includes predicted communication efficiency, predicted communication quality, or the like.

In some embodiments, for each of the plurality of data processing devices, the cloud platform may obtain a plurality of historical communication effects of the data processing device, and determine a ratio of a count of historical communication effects being smaller than a predetermined communication effect threshold to a total count of historical communication effects as a communication failure rate. The cloud platform may determine an average communication duration and an average communication data volume when the communication effect is poor. Then the cloud platform may determine the predicted communication effect based on the communication failure rate, the average communication duration and the average communication data volume when the communication effect is poor, and an ideal communication duration and an ideal communication data volume corresponding to the production condition and the signaling information. The communication effect is poor means that the historical communication effects are lower than a predetermined communication effect threshold. More descriptions of the predetermined communication effect threshold may be found in the related descriptions of FIG. 2.

Merely by way of example, the cloud platform may determine the predicted communication efficiency by Equation (1), and determine the predicted communication quality by Equation (2).

$$E_e = TI_{min}/(TI_{min} * (1 - R_p) + T_a * R_p), \quad (1)$$

$$Q_e = 1 - (DI_{max} - Q_a) * R_p/DI_{max}, \quad (2)$$

wherein $E_e$ denotes the predicted communication efficiency, $TI_{min}$ denotes a minimum ideal communication duration, $R_y$ denotes the communication failure rate, $T_a$ denotes the average communication duration when the communication effect is poor, $Q_e$ denotes the predicted communication quality, $DI_{max}$ denotes a maximum ideal communication data volume, and $Q_a$ denotes the average communication data volume when the communication effect is poor.

More descriptions of the predetermined communication effect threshold, the data communication effect, the ideal communication duration, and the ideal communication data volume may be found in FIG. 2 and the related descriptions thereof.

As shown in FIG. 3, in some embodiments, for each of the plurality of data processing devices, the cloud platform may also obtain a sequence 341 of communication frequencies and a sequence 342 of communication data volumes of each of the plurality of data processing devices in a historical time period. The cloud platform may determine, based on the obstacle distribution information 321, the wireless communication distance 322, the sequence 341 of communication frequencies, and the sequence 342 of communication data volumes of the data processing device, the predicted communication effect 350 of the data processing device by a communication effect prediction model 330. The historical time period is a period of time prior to the start of the next production cycle/process/batch.

The communication effect prediction model is a model configured to determine the predicted communication effect. In some embodiments, the communication effect prediction model may be a machine learning model, e.g., a Recurrent Neural Network (RNN) model, a Long Short Term Memory Network (LSTM) model, or the like.

In some embodiments, an input of the communication effect prediction model includes the obstacle distribution information 321, the wireless communication distance 322, the sequence 341 of communication frequencies, and the sequence 342 of communication data volumes of the data processing device, the predicted communication effect 350 of the data processing device. An output of the communication effect prediction model includes the predicted communication effect of the data processing device.

The sequence of communication frequencies is a sequence comprising communication frequencies of a plurality of sub-time periods within the historical time period, and the sequence of communication data volumes is a sequence comprising communication data volumes of a plurality of sub-time periods within the historical time period. The sequence of communication frequencies and the sequence of communication data volumes may be obtained based on communication logs obtained by the data processing device and the communication device. More descriptions of the communication frequency and the communication data volume may be found in FIG. 2 and the related descriptions thereof.

In some embodiments, the cloud platform may train the communication effect prediction model based on a plurality of training samples with labels by a variety of techniques and update model parameters. For example, the communication effect prediction model may be trained based on a gradient descent technique. Merely by way of example, the plurality of training samples with labels may be input into an initial communication effect prediction model, and a loss function may be constructed based on the labels and an output of the initial communication effect prediction model. Parameters of the initial communication effect prediction model may be iteratively updated based on the loss function. When the loss function meets a preset condition, the model training is complete, and the trained communication effect prediction model is obtained. The preset condition may include the loss function converging, a count of iterations reaching a threshold, or the like.

In some embodiments, the training samples include sample obstacle distribution information, a sample wireless communication distance, a sample sequence of communication frequencies, and a sample sequence of communication data volumes corresponding to a sample data processing device during a sample time period, and the training samples may be acquired based on historical data during a historical production process.

In some embodiments, the label of the training sample may be an actual communication effect of the sample data processing device during a time period after the sample time period. In some embodiments, the cloud platform may determine an average of actual communication effects of the sample data processing device during the time period after the sample time period in the historical data corresponding to the historical production process as the label corresponding to the training sample.

In some embodiments, the cloud platform may also determine training samples corresponding to different production periods based on historical data corresponding to different production periods of the historical production process. The production period refers to a stage in which the product is located in the production process. For example, the production period may be divided into a pre-production period, a mid-production period, and a late-production period. The production periods may also be divided in other ways.

In some embodiments, the cloud platform may determine the production period based on the production process corresponding to the production product. For example, if a product has six production processes, the cloud platform may determine the production stages corresponding to the first two production processes as the pre-production period, the production stages corresponding to the middle two production processes as the mid-production period, and the production stages corresponding to the last two production processes as the late-production period.

In some embodiments, the cloud platform may construct different sample sets based on different production periods of the historical production process. In some embodiments, the cloud platform may classify a plurality of training samples constructed based on historical data corresponding to the pre-production period as a first class of sample set, a plurality of training samples constructed based on historical data corresponding to the mid-production period as a second class of sample set, and a plurality of training samples constructed based on historical data corresponding to the late-production period as a third class of sample set. The specific manner of constructing the training samples may be found in the related descriptions above.

In some embodiments, each sample set includes positive samples and negative samples. The positive samples are training samples with labels that are not less than the predetermined communication effect threshold, and the negative samples are training samples with labels that are less than the predetermined communication effect threshold. In some embodiments, when the cloud platform constructs the sample sets, a count of the positive samples and a count of the negative samples may be as close as possible. For example, the cloud platform may ensure that a difference in the count of the positive samples and the count of the negative samples is less than a predetermined difference threshold. By maintaining the count of the positive samples and the count of the negative samples in the training sample sets to be close, model training imbalance can be avoided, thereby ensuring high accuracy of the output of the model over a wider range.

In some embodiments, the counts of training samples in the different sample sets may be in a predetermined initial ratio. For example, the initial ratio of the count of training samples in the first class of sample set, the count of training samples in the second class of sample set, and the count of training samples in the third class of sample set may be 1:1:1.

In some embodiments, the cloud platform may also adjust the ratio of the counts of training samples in different sample sets based on an average value of reliability data corresponding to the data processing devices in different production periods based on the initial ratio. For example, if the average values of the reliability data corresponding to the data processing devices of the three production periods are 0.6, 0.7, and 0.8, respectively, the ratio of the counts of training samples in the training sample sets corresponding to the three production periods may be $$\frac{1}{0.6}:\frac{1}{0.7}:\frac{1}{0.8}.$$

In some embodiments, the cloud platform may sequentially select one or more training samples from the first class of sample set, the second class of sample set, and the third class of sample set and input the training samples into the initial communication effect prediction model. Then the cloud platform may construct a loss function based on the labels corresponding to the one or more training samples and an output of the initial communication effect prediction model, and iteratively update the parameters of the initial communication effect prediction model based on the loss function. More descriptions of the loss function and iteratively updating may be found in the related descriptions above.

The wireless communication effect is typically influenced by a communication distance, air humidity, and obstacles. Some embodiments of the present disclosure collect data such as obstacle distribution information and a wireless communication distance in a factory, and reasonably predict the communication effect, so as to timely adjust relevant parameters affecting the data communication prior to the start of production. More descriptions of pre-adjustment, see FIG. 4 and the related descriptions.

In some embodiments of the present disclosure, the predicted communication effect is determined by the communication effect prediction model, so that the obtained predicted communication effect is more accurate. Considering a difference in communication frequency and communication data volume, which may also lead to varying loads on the communication device and thereby affect the data communication effect, using the communication frequency and communication data volume as inputs to the communication effect prediction model can ensure the reliability of the model output results. This can provide reasonable data support for subsequent adjustments to the wireless communication effect, thereby ensuring timely monitoring of the production situation on the production line.

In some embodiments, the predicted communication effects determined by the manner described above may include some less reliable predicted communication effects, and data integration may be performed on the predicted communication effects to improve reliability.

In some embodiments, for each of the plurality of data processing devices, the cloud platform may perform the following operation S1-S3 to process the predicted communication effect for the data processing device.

In S1, determining communication effect change data based on a historical communication effect of the data processing device in each of a plurality of historical time periods.

In some embodiments, the historical communication effects of the data processing device are stored directly in the cloud platform, and the cloud platform may directly retrieve the historical communication effects of the data processing device.

The communication effect change data refers to a change of the historical communication effects in different historical time periods. The communication effect change data includes communication efficiency change data, communication quality change data, or the like.

In some embodiments, the communication effect change data may be represented as a sequence of differences between different the historical communication effects and a baseline communication effect. The baseline communication effect may be a first acquired historical communication effect, an average of a plurality of historical communication effects, or the like. For example, the historical communication efficiency for three historical time periods is 0.7, 0.73, and 0.75, respectively, and the communication efficiency change data may be expressed as (0, 0.03, 0.05).

In S2, determining reliability data of the predicted communication effect of the data processing device based on the communication effect change data.

The reliability data refers to a degree of reliability of the predicted communication effect corresponding to the data processing device. The reliability data may be expressed as a value between 0 and 1, with a larger value indicating that the data processing device corresponds to a more reliable predicted communication effect.

In some embodiments, the reliability data of the predicted communication effect is negatively correlated with a degree of fluctuation of the historical communication effects. For example, the greater the degree of fluctuation of the historical communication effects is, the lower the degree of reliability of the predicted communication effect is.

In some embodiments, the degree of fluctuation of the historical communication effects may be represented by data such as standard deviation or variance of all sequence elements in the communication effect change data.

In some embodiments, the cloud platform may obtain the reliability data based on the communication effect change data by Equation (3):

$$D_R = 1 - \alpha * \frac{A_{ce}}{A_e} - \beta * \frac{A_{cq}}{A_q}, \quad (3)$$

Wherein, $D_R$ denotes the reliability data, $A_{ce}$ denotes an average value of all sequence elements in the communication efficiency change data, $A_e$ denotes an average historical communication efficiency, $A_{cq}$ denotes an average value of all sequence elements in the communication quality change data, $A_q$ denotes an average historical communication quality, and $\alpha$ and $\beta$ are weights.

In some embodiments, the weights $\alpha$ and $\beta$ may be determined based on a comparative analysis of the predicted communication effect versus an actual communication effect corresponding to a same production cycle/process/batch in the historical data. The cloud platform may determine a count of estimates of predicted communication efficiency where a difference from an actual communication efficiency exceed a predetermined threshold, and determine a count of estimates of predicted communication quality where a difference from an actual communication quality exceed the predetermined threshold. The weights $\alpha$ and $\beta$ may be determined based on a ratio of the two counts.

For example, in a plurality of predicted communication effects, 100 predicted communication effects have a difference from the actual communication effect that exceeds the predetermined threshold. Among the 100 predicted communication effects, the count of estimates of predicted communication efficiency where the difference from the actual communication efficiency exceeds the predetermined threshold is 60, the count of estimates of predicted communication quality where the difference from the actual communication quality exceeds the predetermined threshold is 30, and a count of estimates where both the predicted communication efficiency and the predicted communication quality exceed the predetermined threshold is 10. Therefore, $\alpha=(60+10)/110=7/11$, and $\beta=4/11$.

In S3, sending a data integration instruction, based on the reliability data, to perform data integration on the predicted communication effect.

The data integration instruction is an instruction for performing processing on the predicted communication effect. In some embodiments, the data integration instruction may be configured to remove a predicted communication effect for which the reliability data is below a reliability threshold. The reliability threshold may be set either by a human or a system for information service of IIoT based on the cloud platform.

In some embodiments, the cloud platform may, based on the data integration instruction, remove the predicted communication effect for which the reliability data is below the reliability threshold to obtain an integrated predicted communication effect.

The wireless communication effect within a factory may experience dynamic fluctuations, and traditional static analysis may not suffice for accuracy. Some embodiments of the present disclosure analyze the communication effect change data, and then determine the reliability data of the predicted communication effect in order to remove predicted communication data with lower reliability, thereby ensuring the reliability of the data.

FIG. 4 is a flowchart illustrating an exemplary process for determining a pre-adjustment instruction and a real-time adjustment instruction according to some embodiments of the present disclosure. As shown in FIG. 4, process 400 includes the following operations. In some embodiments, the process 400 may be performed by a cloud platform.

In 410, determining a first signal interference type of a factory (referred to as a current factory) and a first probability distribution corresponding to the first signal interference type based on an associated production condition, associated signaling information, and an associated predicted communication effect of at least one associated factory.

An associated factory is another factory related to the current factory. For example, the associated factory for a factory that produces mineral water may be a factory that produces purified water, or the like. The current factory and the associated factory are associated with each other. A plurality of associated factories may be associated with each other.

In some embodiments, the cloud platform may determine the at least one associated factory of the current factory based on production data of factories corresponding to IIoT platforms that are communicatively connected with the cloud platform.

The production data refers to data related to the production of a product, for example, a product type, a production beat, a production quantity, a production process, or the like. The production beat refers to a duration it takes to produce a product. Production data corresponding to different production lines in each of the factories corresponding to the IIoT platforms that are communicatively connected with the cloud platform may be obtained.

In some embodiments, the production data of the production lines may be statistically obtained by a monitoring device. In some embodiments, the production data of the production lines may also be statistically obtained by staff in the factories. The obtained production data may be uploaded to an IIoT sensing network platform via a communication device, and then uploaded to the cloud platform by the IIoT sensing network platform.

In some embodiments, the cloud platform may identify one or more factories that produce a type of product similar to the products produced by the current factory based on the production data.

The associated production condition is a production condition corresponding to the associated factory. The associated signaling information is signaling information corresponding to the associated factory, and the associated predicted communication effect is a predicted communication effect corresponding to the associated factory.

In some embodiments, the cloud platform may determine, based on the associated production condition and the associated signaling information of the at least one associated factory, an associated predicted communication effect for each of the plurality of data processing devices in each of the at least one associated factory through the manner of determining the predicted communication effect described in FIG. 3.

More descriptions of the production condition, the signaling information, and the predicted communication effect may be found in FIG. 2 and the related descriptions thereof.

The first signal interference type is a signal interference type determined based on the at least one associated factory. More descriptions of the signal interference type may be found in FIG. 2 and the related descriptions thereof.

The first probability distribution is a probability distribution corresponding to the first signal interference type. More descriptions of the probability distribution may be found in FIG. 2 and the related descriptions thereof.

In some embodiments, for any associated data processing device (i.e., the data processing device installed in the associated factory) installed on the production line of any one of the at least one associated factory, the cloud platform may obtain a plurality of historical data communication effects of the associated data processing device in a predetermined historical time period, and determine, based on one or more historical data communication effects that are less than a predetermined communication effect threshold, the first signal interference type of the factory and the first probability distribution corresponding to the first signal interference type. More descriptions of the predetermined communication effect threshold may be found in FIG. 2 and the related descriptions thereof.

The manner of determining the first signal interference type and the corresponding first probability distribution based on the one or more historical data communication effects that are less than the predetermined communication effect threshold is similar to the manner of determining the signal interference type and the corresponding probability distribution based on the one or more historical data communication effects that are less than the predetermined communication effect threshold.

In some embodiments, for each of the at least one associated factory, the cloud platform may establish at least one data set including historical production conditions and historical signaling information corresponding to the associated factory based on at least one historical data communication effect that is less than the predetermined communication effect threshold, and obtain at least one cluster set and at least one target cluster by clustering. Further, the cloud platform may determine a signal interference type corresponding to the at least one target cluster and a probability of occurrence corresponding to the signal interference type.

In some embodiments, after determining the signal interference type and the corresponding probability of occurrence for at least one target cluster corresponding to each of the at least one associated factory, the cloud platform may determine target clusters from different associated factories that have similar historical communication effects as reference clusters, and determine the signal interference type corresponding to at least one reference cluster as the first signal interference type. Based on the probability of occurrence of the signal interference type corresponding to the at least one reference cluster, the cloud platform may then determine the first probability distribution. Having similar historical communication effects may be that differences in the historical communication effects are less than a difference threshold. More descriptions of the embodiment may be found in FIG. 2 and the related descriptions thereof.

In some embodiments of the present disclosure, by collecting the predicted communication effects of other similar factories in similar production situations, effective and practical data references can be provide for the predicted communication effect of the current factory, thereby ensuring the effectiveness of wireless communication adjustments.

In 420, determining one or more reference factories from the at least one associated factory and determining a second signal interference type of the current factory and a second probability distribution corresponding to the second signal interference type based on the signaling information of the current factory and reference signaling information of the one or more reference factories.

A reference factory is a factory selected from the at least one associated factory.

In some embodiments, the cloud platform may select the one or more reference factories from the at least one associated factory based on the data communication effect of each of a plurality of associated data processing devices provided within each of the at least one associated factory. For example, the cloud platform may identify an associated factory with an average of data communication effects exceeding the predetermined communication effect threshold as a reference factory. The data communication effects of the associated data processing devices may include actual communication effects and predicted communication effects.

The manner of acquiring the data communication effect of each data processing device in the associated factory is similar to the manner of acquiring the data communication effect of each data processing device in the current factory, which may be found in the related descriptions of FIG. 2.

In some embodiments, for each of the at least one associated factory, in response to determining that the average of predicted communication effects of the plurality of data processing devices in the associated factory is less than the predetermined communication effect threshold, the cloud platform may determine, based on an average of actual communication effects of the plurality of data processing devices in the associated factory, whether the associated factory may be determined as the reference factory. In some embodiments, in response to determining that the average of actual communication effects of the associated factory is not less than the predetermined communication effect threshold, the cloud platform may determine the associated factory as the reference factory.

The second signal interference type is a signal interference type determined based on the one or more reference factories. The second probability distribution is the probability distribution corresponding to the second signal interference type.

In some embodiments, the cloud platform may determine a difference situation between the signaling information of the current factory and the reference signaling information of the one or more one or more reference factories, and determine the second signal interference type of the current factory and the second probability distribution corresponding to the second signal interference type based on the difference situation.

In some embodiments, the difference situation includes a difference in wireless communication distance, a difference in obstacle distribution information, a difference in communication frequency, or the like.

It may be understood that the production conditions and production data of the one or more reference factories and the current factory are similar. If the data communication effect of the current factory differs significantly from the actual data communication effect of the one or more reference factories, it may be due to a difference in signaling information.

Each type of differences corresponds to a second signal interference type. For example, if the difference situation is the difference in the wireless communication distance, it may be determined that the second signal interference type is the wireless communication distance.

In some embodiments, the cloud platform may determine the second probability distribution corresponding to the second signal interference type based on a ratio of a count of occurrences of each type of signaling information for which there is a difference situation to a total count of occurrences of signaling information for which there is a difference situation. For example, if the difference situation of the signaling information includes the difference in wireless communication distance, the difference in obstacle distribution information, and the difference in communication frequency, three second signal interference types may be determined. If the difference in obstacle distribution information occurs 15 times, the difference in wireless communication distance occurs 10 times, and the difference in communication frequency occurs 5 times, then the second probability distribution corresponding to the difference in obstacle distribution information is $1/2$, the second probability distribution corresponding to the difference in wireless communication distance is $1/3$, and the second probability distribution corresponding to the difference in communication frequency is $1/6$.

In some embodiments of the present disclosure, if the associated predicted communication effects corresponding to the data processing devices of the at least one associated factory are less than the predetermined communication effect threshold, the cloud platform may determine one or more reference factories based on an associated factory with a relatively high degree of correlation. Then, based on the difference situation between the signaling information of the current factory and the reference signaling information of the one or more reference factories, the second signal interference type and the corresponding probability distribution of the current factory can be reasonably determined.

In 430, generating the pre-adjustment instruction based on the first signal interference type and the first probability distribution corresponding to the first signal interference type, and generating the real-time adjustment instruction based on the second signal interference type and the second probability distribution corresponding to the second signal interference type.

In some embodiments, the manner of generating the real-time adjustment instruction and the pre-adjustment instruction may be the same as the manner of generating the communication adjustment instruction. For example, the generated real-time adjustment instruction may include at least one of a real-time position adjustment instruction and/a real-time parameter adjustment instruction, and the generated pre-adjustment instruction may include at least one of a pre-position adjustment instruction and a pre-parameter adjustment instruction. More description of this embodiment may be found in FIG. 2 and the related descriptions thereof.

In some embodiments, the cloud platform may adjust instruction parameters of the real-time adjustment instruction based on reliability data of the predicted communication effect to obtain instruction parameters of the pre-adjustment instruction.

The instruction parameters of the real-time adjustment instruction may include a first position distribution and a second position distribution in the real-time position adjustment instruction, and a type of communication parameters to be adjusted and a corresponding parameter adjustment amount in the real-time parameter adjustment instruction. The instruction parameters of the pre-adjustment instruction may include a first position distribution and a second position distribution in the pre-position adjustment instruction, and a type of communication parameters to be adjusted and a corresponding parameter adjustment amount in the pre-parameter adjustment instruction.

In some embodiments, the cloud platform may determine an adjustment coefficient based on the reliability data of the predicted communication effect, and adjust the parameter adjustment amount in the real-time adjustment instruction based on the adjustment coefficient, to obtain the instruction parameters of the pre-adjustment instruction. More descriptions of the reliability data may be found in FIG. 3 and the related descriptions thereof. The parameter adjustment amount in the real-time adjustment instruction may include a position movement amount of the data processing device, a position movement amount of the obstacle, and/or a communication parameter adjustment amount.

In some embodiments, the cloud platform may also perform data integration on the predicted communication effect of a plurality of data processing devices in each of the at least one associated factory. The manner of data integration of the predicted communication effects of the data processing devices of the associated factory is the same manner as the manner of data integration of the predicted communication effects of the data processing devices of the current factory, more descriptions of which may be found in the related descriptions in FIG. 3.

In some embodiments, the cloud platform may rank the at least one associated factory based on an average data communication effect of the plurality of data processing devices of each of the at least one associated factory, and determine a target associated factory based on a ranking result. The cloud platform may further generate a data fetching instruction to fetch an associated production condition and associated signaling information of the target associated factory, and generate the parameter adjustment instruction based on the associated production condition and the associated signaling information of the target associated factory.

In some embodiments, the cloud platform may rank the at least one associated factory based on the average of integrated predicted communication effects of the plurality of data processing devices of each of the at least one associated factory to obtain a first ranking, and rank the at least one associated factory based on the average of the actual communication effects of the plurality of data processing devices of each of the at least one associated factory to obtain a second ranking.

In some embodiments, the cloud platform may prioritize determining the target associated factory based on the first ranking. In some embodiments, in response to determining that the average of the integrated predicted communication effects of the plurality of data processing devices of each of the at least one associated factory is less than the predetermined communication effect threshold, the cloud platform may determine the target associated factory based on the second ranking. For example, the cloud platform may determine the associated factory that ranks first in the first ranking or the second ranking as the target associated factory.

The data fetching instruction is an instruction configured to fetch the associated production condition and the associated signaling information of the target associated factory. After determining the target associated factory, the cloud platform may automatically generate the data fetching instruction.

In some embodiments, the cloud platform may generate the parameter adjustment instruction based on the associated production condition and the associated signaling information of the target associated factory to adjust the communication parameters of the current factory in a direction that makes the communication parameters of the current factory more similar to the communication parameters of the target associated factory. More descriptions of the communication parameters may be found in FIG. 2 and the related descriptions thereof.

In some embodiments, the cloud platform may directly determine a difference between the communication parameters of the target associated factory and the communication parameters of the current factory as the parameter adjustment amount corresponding to the parameter adjustment instruction.

In some embodiments, the cloud platform may adjust the difference between the communication parameters of the target associated factory and the communication parameters of the current factory based on the average of the data communication effects and corresponding reliability data of the plurality of data processing devices in the target associated factory, thereby determining the parameter adjustment amount corresponding to the parameter adjustment instruction. It should to be noted that when the cloud platform determines the target associated factory based on the second ranking, the reliability data may be 1.

Pre-adjustment ensures that adjustments are made in a timely manner and avoids affecting the normal production activities of the factory, however, pre-adjustment may not always satisfy a user's production needs if the associated predicted communication effect is unreliable. Some embodiments of the present disclosure determine whether to make a pre-adjustment based on the reliability of the associated predicted communication effect, and rank at least one associated factory based on their communication effects, thus obtaining realistic and effective communication parameters from the at least one associated factory, and ensuring adjustment efficiency.

In 440, sending the pre-adjustment instruction and the real-time adjustment instruction to the IIoT sensing network platform, and sending an adjustment result to an IIoT user platform sequentially through an IIoT management platform and an IIoT service platform.

In some embodiments, the cloud platform may prioritize sending the pre-adjustment instruction to the IIoT sensing network platform, and then the IIoT sensing network platform sends the pre-adjustment instruction to the IIoT management platform. In some embodiments, in response to determining that all predicted communication effects of the plurality of data processing devices of the current project are less than the predetermined communication effect threshold, the cloud platform may send the real-time adjustment instruction to the IIoT sensing network platform. Then the IIoT sensing network platform sends the real-time adjustment instruction to the IIoT management platform.

In some embodiments, the pre-adjustment instruction or the real-time adjustment instruction may be further sent by the IIoT sensing network platform to the IIoT management platform or an IIoT perception and control platform. For more description of adjusting positions and adjusting parameters see FIG. 2 and its related descriptions.

The adjustment result is a relevant parameter after adjusting influencing factors of data communication. The adjustment result may include adjusted signaling information, adjusted communication information, adjusted data communication effect, or the like. The adjustment result may be obtained by the data processing device, or the like. More descriptions of the influencing factors of data communication may be found in FIG. 2 and the related descriptions thereof.

In some embodiments of the present disclosure, by combining pre-adjustment with real-time adjustment, the timeliness of the adjustments can be ensured as much as possible. By sending the adjustment result to the IIoT user platform, users can more intuitively understand the effects of the adjustments, thereby improving user experience.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

It should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the count of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for information service of Industrial Internet of Things (IIoT) based on a cloud platform, wherein the method is implemented based on the cloud platform, the cloud platform includes distributed servers and the cloud platform communicates with a plurality of IIoT platforms of a plurality of factories via the distributed servers, each of the plurality of IIoT platforms includes an IIoT user platform, an IIoT service platform, an IIoT management platform, an IIoT sensing network platform, and an IIoT perception and control platform connected in sequence, the IIoT perception and control platform is configured with a plurality of data processing devices, the IIoT sensing network platform is communicatively connected to the plurality of data processing devices via a communication device, and the method comprises:

for each of the plurality of factories,
obtaining, based on the IIoT sensing network platform, a production condition of the factory, signaling information of the factory, and communication information between the communication device and the plurality of data processing devices;
determining a data communication effect of each of the plurality of data processing devices based on the production condition, the signaling information, and the communication information, the data communication effect including communication efficiency and communication quality; and
determining a signal interference type of the factory and a probability distribution corresponding to the signal interference type of the factory based on data communication effects of the plurality of data processing devices, and generating and sending a communication adjustment instruction to the IIoT sensing network platform, the communication adjustment instruction including at least one of a position adjustment instruction and a parameter adjustment instruction, wherein the position adjustment instruction is used for adjusting setting positions of the data processing devices, and the parameter adjustment instruction is used for adjusting communication parameters of the data processing devices.

2. The method of claim 1, wherein the method further comprises:
obtaining obstacle distribution information and a wireless communication distance of each of the plurality of data processing devices based on the production condition and the signaling information; and
determining a predicted communication effect of each of the plurality of data processing devices in a future time period based on the obstacle distribution information and the wireless communication distance of each of the plurality of data processing devices.

3. The method of claim 2, wherein the data communication effect of each of the plurality of the data processing devices includes a historical communication effect of the data processing device in each of a plurality of historical time periods, and the method further comprises:

for each of the plurality of data processing devices,
determining communication effect change data based on the historical communication effect of the data processing device in each of the plurality of historical time periods;
determining reliability data of the predicted communication effect of the data processing device based on the communication effect change data; and
sending a data integration instruction, based on the reliability data, to perform data integration on the predicted communication effect.

4. The method of claim 1, wherein the communication adjustment instruction further includes a pre-adjustment instruction and a real-time adjustment instruction, and the method further comprises:

determining a first signal interference type of the factory and a first probability distribution corresponding to the first signal interference type based on an associated production condition, associated signaling information, and an associated predicted communication effect of at least one associated factory;
determining one or more reference factories from the at least one associated factory and determining a second signal interference type of the factory and a second probability distribution corresponding to the second signal interference type based on the signaling information of the factory and reference signaling information of the one or more reference factories;
generating the pre-adjustment instruction based on the first signal interference type and the first probability distribution corresponding to the first signal interference type, and generating the real-time adjustment instruction based on the second signal interference type and the second probability distribution corresponding to the second signal interference type; and
sending the pre-adjustment instruction and the real-time adjustment instruction to the IIoT sensing network platform, and sending an adjustment result to the IIoT user platform sequentially through the IIoT management platform and the IIoT service platform.

5. A system for information service of Industrial Internet of Things (IIoT) based on a cloud platform, wherein the system includes the cloud platform and a plurality of IIoT platforms of a plurality of factories, the cloud platform includes distributed servers and the cloud platform communicates with the plurality of IIoT platforms of the plurality of factories via the distributed servers, each of the plurality of IIoT platform includes an IIoT user platform, an IIoT service platform, an IIoT management platform, an IIoT sensing network platform, and an IIoT perception and control platform connected in sequence, the IIoT perception and control platform is configured with a plurality of data processing devices, the IIoT sensing network platform is communicatively connected to the plurality of data processing devices via a communication device, and the cloud platform is configured to:

for each of the plurality of factories,
obtain, based on the IIoT sensing network platform, a production condition of the factory, signaling information of the factory, and communication information between the communication device and the plurality of data processing devices;
determine a data communication effect of each of the plurality of data processing devices based on the production condition, the signaling information, and the communication information, the data communication effect including communication efficiency and communication quality; and
determine a signal interference type of the factory and a probability distribution corresponding to the signal interference type of the factory based on data communication effects of the plurality of data processing devices, and generate and send a communication adjustment instruction to the IIoT sensing network platform, the communication adjustment instruction including at least one of a position adjustment instruction and a parameter adjustment instruction, wherein the position adjustment instruction is used for adjusting setting positions of the data processing devices, and the parameter adjustment instruction is used for adjusting communication parameters of the data processing devices.

6. The system of claim 5, wherein the cloud platform includes a service cloud partition, a management cloud partition, and a sensing cloud partition, the service cloud partition being communicatively connected to the IIoT service platform, the management cloud partition being communicatively connected to the IIoT management platform, and the sensing cloud partition being communicatively connected to the IIoT sensing network platform.

7. The system of claim 5, wherein the cloud platform is further configured to:

obtain obstacle distribution information and a wireless communication distance of each of the plurality of data processing devices based on the production condition and the signaling information; and
determine a predicted communication effect of each of the plurality of data processing devices in a future time period based on the obstacle distribution information and the wireless communication distance of each of the plurality of data processing devices.

8. The system of claim 7, wherein the data communication effect of each of the plurality of the data processing devices includes a historical communication effect of the data processing device in each of a plurality of historical time periods, and the cloud platform is further configured to:

for each of the plurality of data processing devices,
determine communication effect change data based on the historical communication effect of the data processing device in each of the plurality of historical time periods;
determine reliability data of the predicted communication effect of the data processing device based on the communication effect change data; and
send a data integration instruction, based on the reliability data, to perform data integration on the predicted communication effect.

9. The system of claim 5, wherein the communication adjustment instruction further includes a pre-adjustment instruction and a real-time adjustment instruction, and the cloud platform is further configured to:

determine a first signal interference type of the factory and a first probability distribution corresponding to the first signal interference type based on an associated production condition, associated signaling information, and an associated predicted communication effect of at least one associated factory;
determine one or more reference factories from the at least one associated factory and determine a second signal interference type of the factory and a second probability distribution corresponding to the second signal interference type based on the signaling information of the factory and reference signaling information of the one or more reference factories;

generate the pre-adjustment instruction based on the first signal interference type and the first probability distribution corresponding to the first signal interference type, and generate the real-time adjustment instruction based on the second signal interference type and the second probability distribution corresponding to the second signal interference type; and send the pre-adjustment instruction and the real-time adjustment instruction to the IIoT sensing network platform, and send an adjustment result to the IIoT user platform sequentially through the IIoT management platform and the IIoT service platform.

10. A non-transitory computer-readable storage medium, wherein the storage medium stores a computer instruction, and when the computer instruction is executed by a processor, a method for information service of Industrial Internet of Things (IIoT) based on a cloud platform is implemented, wherein the method is implemented based on the cloud platform, the cloud platform includes distributed servers and the cloud platform communicates with a plurality of IIoT platforms of a plurality of factories via the distributed servers, each of the plurality of IIoT platforms includes an IIoT user platform, an IIoT service platform, an IIoT management platform, an IIoT sensing network platform, and an IIoT perception and control platform connected in sequence, the IIoT perception and control platform is configured with a plurality of data processing devices, the IIoT sensing network platform is communicatively connected to the plurality of data processing devices via a communication device, and the method comprises:

for each of the plurality of factories, obtaining, based on the IIoT sensing network platform, a production condition of the factory, signaling information of the factory, and communication information between the communication device and the plurality of data processing devices;

determining a data communication effect of each of the plurality of data processing devices based on the production condition, the signaling information, and the communication information, the data communication effect including communication efficiency and communication quality; and determining a signal interference type of the factory and a probability distribution corresponding to the signal interference type of the factory based on data communication effects of the plurality of data processing devices, and generating and sending a communication adjustment instruction to the IIoT sensing network platform, the communication adjustment instruction including at least one of a position adjustment instruction and a parameter adjustment instruction, wherein the position adjustment instruction is used for adjusting setting positions of the data processing devices, and the parameter adjustment instruction is used for adjusting communication parameters of the data processing devices.

* * * * *